INVENTOR.
Lynn T. Elliott.
HIS ATTORNEYS.

Nov. 1, 1960  L. T. ELLIOTT  2,958,197
OPERATOR FOR VALVE WITH ROTATABLE STEM OR THE LIKE
Filed Aug. 20, 1956  5 Sheets-Sheet 4

INVENTOR.
Lynn T. Elliott.
BY
HIS ATTORNEYS.

Nov. 1, 1960 — L. T. ELLIOTT — 2,958,197
OPERATOR FOR VALVE WITH ROTATABLE STEM OR THE LIKE
Filed Aug. 20, 1956 — 5 Sheets-Sheet 5
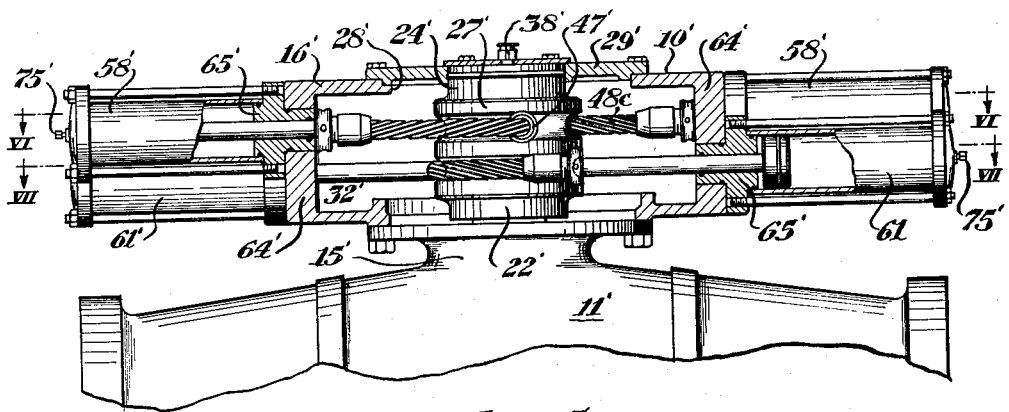
*Fig. 5.*
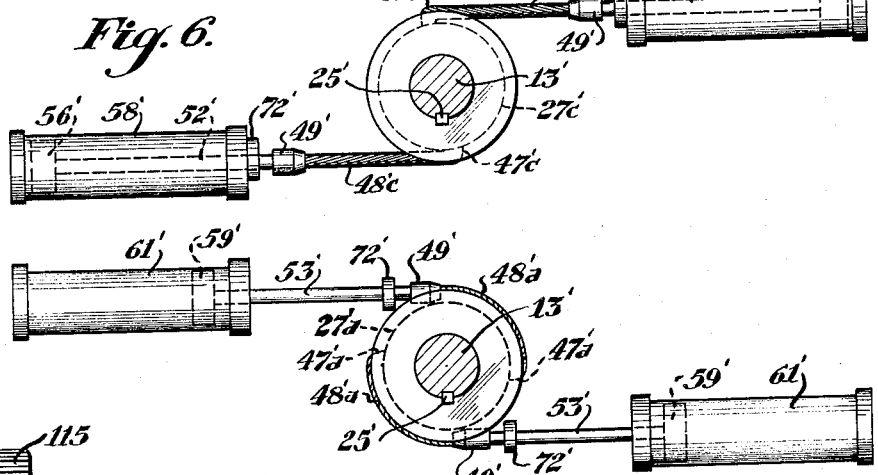
*Fig. 6.*
*Fig. 7.*
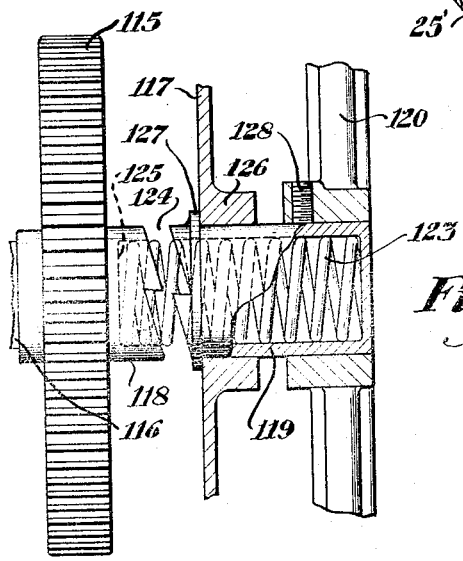
*Fig. 8.*
INVENTOR.
Lynn T. Elliott.
BY Hodges Leonard & Duell
HIS ATTORNEYS.

2,958,197
Patented Nov. 1, 1960

2,958,197

OPERATOR FOR VALVE WITH ROTATABLE STEM OR THE LIKE

Lynn T. Elliott, % 371 M & M Bldg., Houston 2, Tex.

Filed Aug. 20, 1956, Ser. No. 605,075

2 Claims. (Cl. 60—52)

This invention relates to an operator for a rotatable device such as a valve having a rotatable stem or the like. Additionally, this invention pertains to a complementary pull cylinder valve control which is either remotely or proximately fluid actuated, which is powered by line pressure or otherwise or by hand, which is compact and may be in unit form for mounting on a valve to be operated.

In the operation of a rotary valve, for example, it has been one common practice for manufacturers or users to provide a gear head for the operation of the valve. Such gear heads often consist of relatively large reduction worm and worm wheel gear members. Or, cylinder operators may be mounted on other or smaller valves and use a rack connection to the valve stem and/or local manual control for turning a nut which meshes with connections to such rack. When fluid under pressure is used to regulate a valve operator cylinder, either gas has been in direct contact with liquid or push force members or other relatively sizeable or awkward equipment has been utilized with, in many cases, jumping or creeping or other deficiency of operation.

Such prior difficulties may be overcome by a practice of this invention. By means of this invention, a rotatable valve stem or the like may be precisely turned in a relatively positive manner by the employment of my new construction utilizing a tension or pulling force. Moreover, in my invention, the pressure of the fluid immediately actuating my new devices preferably is relatively greatly increased and such devices will be relatively small and compact. Further, a person may control a new operator of this invention by hand at the location of the operator or at a distance therefrom, as the case may be, and/or such operator may be automatically or semi-automatically actuatable by power, either remote or proximate, and any such power operation may be coincidental or non-coincidental as desired relative to any provision for manual operation that may be incorporated. New constructions of this invention exert force evenly and may be mounted in whatever position may be entailed by the service which they are called upon to perform.

Other objects and advantages will be apparent from the following description and from the accompanying drawings, which are only illustrative of my invention, in which Figure 1, as shown, is a plan view of one embodiment of my invention mounted on a rotary plug valve such as might be used in a pipeline;

Figure 5 is a view in elevation, partly in section, of a schematic representation of a further embodiment of my invention shown mounted on a valve having a rotatable stem;

Figure 6 is a view taken along line VI—VI of Figure 5, with parts omitted;

Figure 7 is a view taken along line VII—VII of Figure 5, with parts omitted; and Figure 8 is a more detailed view, somewhat enlarged, of a handwheel subassembly such as is shown in Figure 4 in disengagement position.

Figure 1:
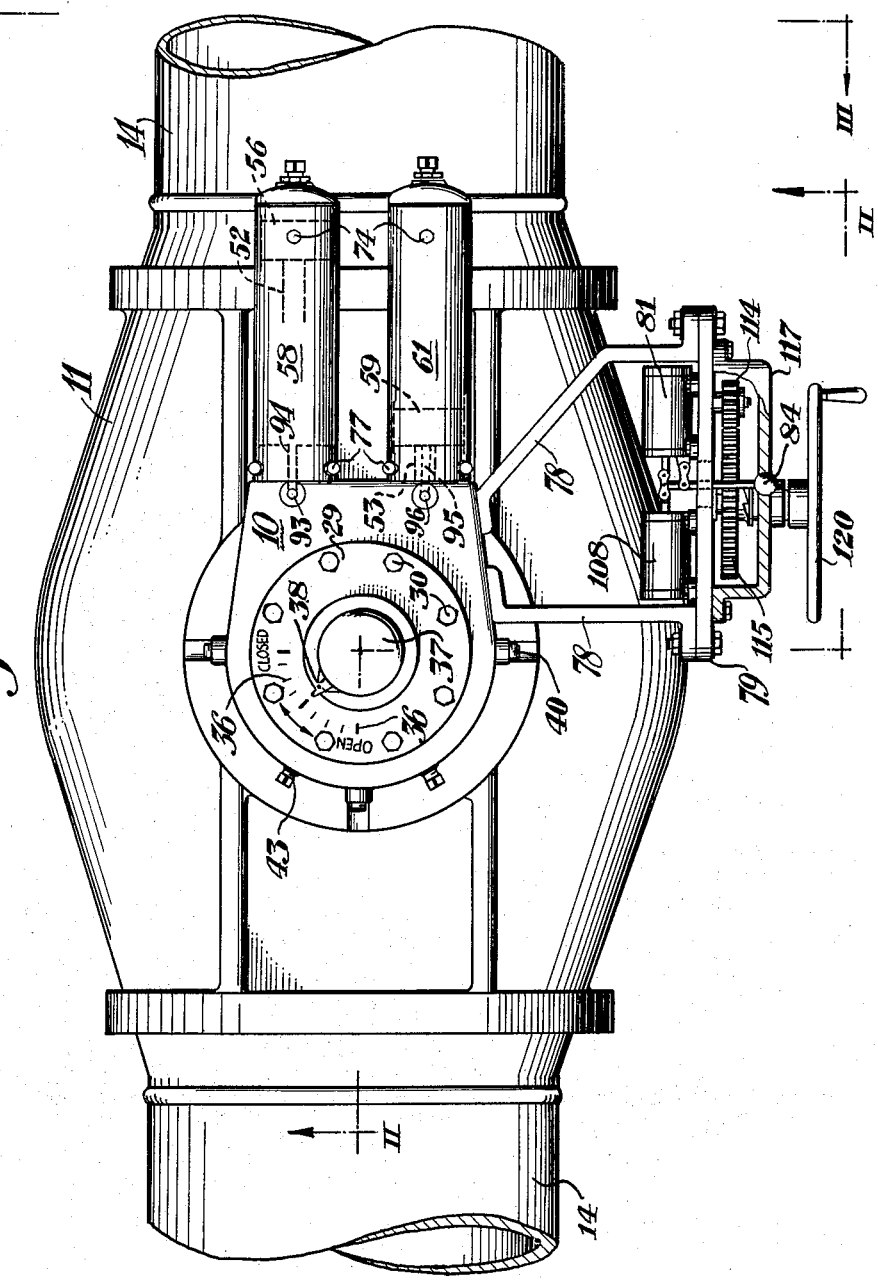
Figure 2:
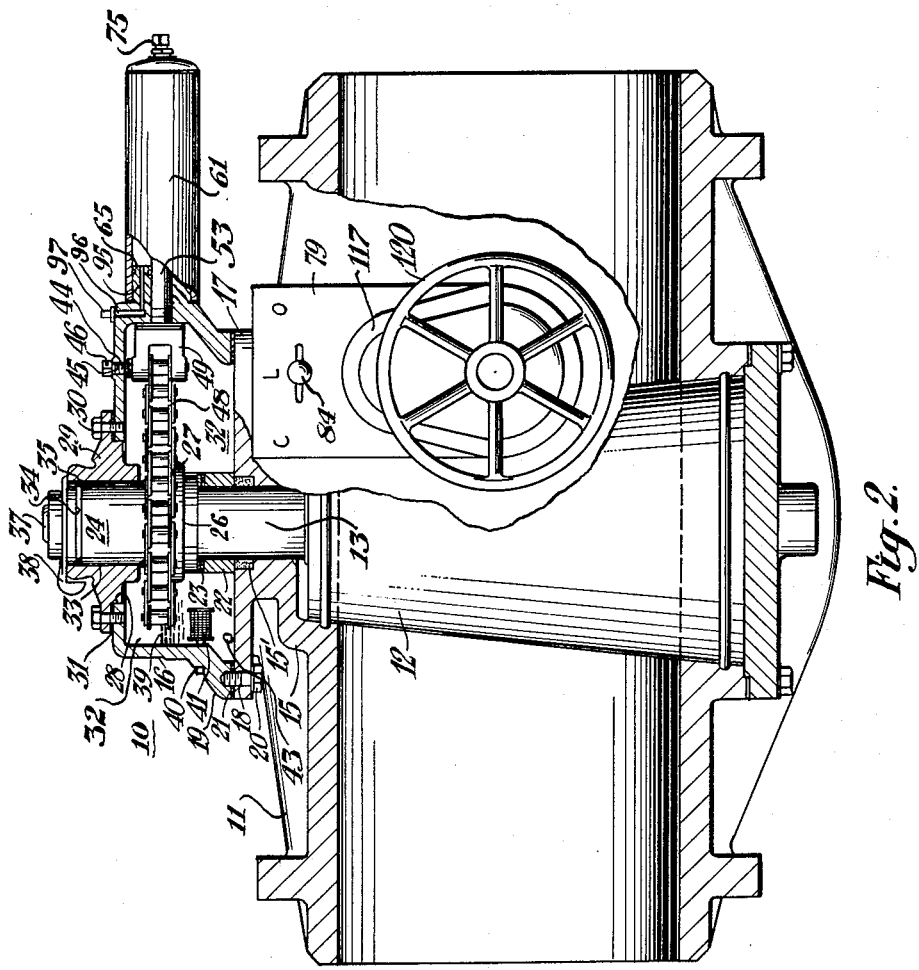
Figure 2 is a view in section of the construction shown in Figure 1 taken along line II—II thereof.
Figure 3:
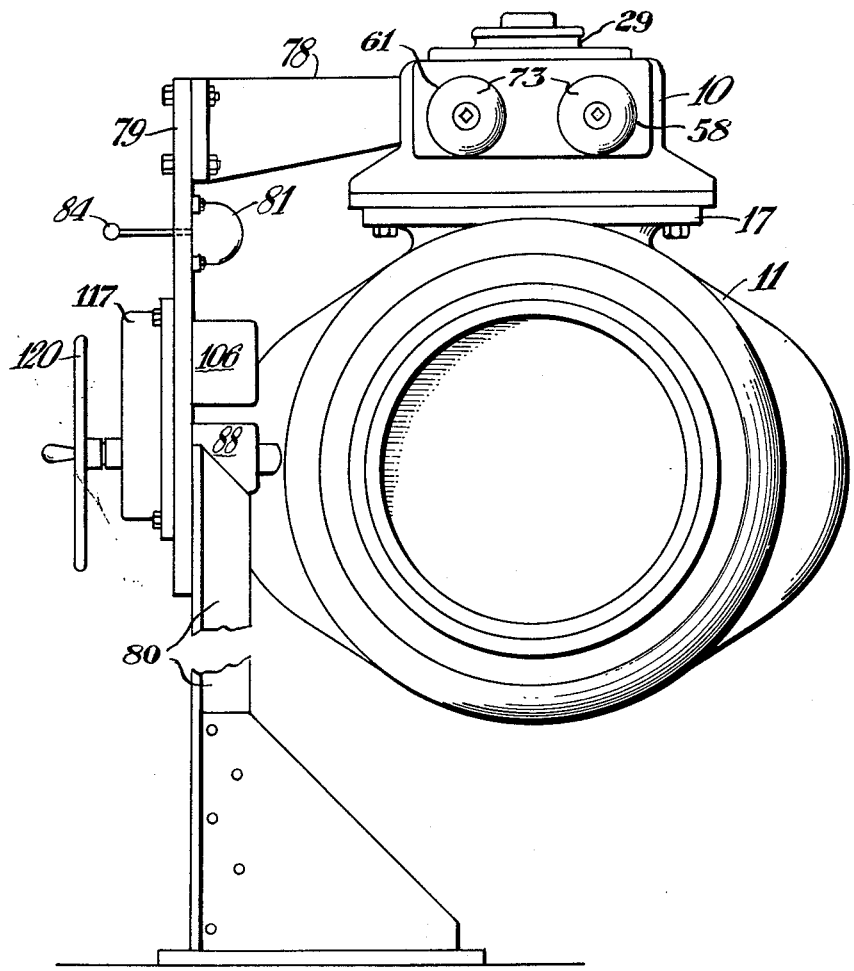
Figure 3 is an end view of the construction shown in Figure 1 taken in the direction of line III—III thereof.

Referring to the drawings, one embodiment made in accordance with my invention may comprise a compact valve operator 10 which may be mounted as a unit on a valve 11 which, for example, may have a rotatable plug 12 therein adapted to be rotated from its open position shown in Figure 2 through 90° to its closed position shown in Figure 1, and vice versa, by a rotatable valve stem 13. Valve 11 may be connected, for example, in a pipeline 14 such as used for the transmission of gas, oil and other fluid substances. Valve stem 13 is properly bushed and extends upward through a bonnet 15 of valve 11 and a circumferential seal 15' into the interior of a housing 16 of unit 10 as shown in Figure 2.

Bonnet 15 may terminate in an annular flange 17 having holes 18 extending through the edge thereof. The lower edge 19 of housing 16 may have countersunk holes in registry with the bolt holes 18, such countersunk holes being tapped to engage bolts 20 to secure unit 10 to valve 11. A gasket 21 may be positioned between base 19 and flange 17 to seal the joint between the two. If desired, housing 16 may be provided with its own separate annular bottom secured to base 19 before unit 10 is mounted on flange 17 and secured thereto.

Stem 13 may extend through a spacer ring 22 and a bearing ring 23 such as an "Oilite" self-lubricating ring, into a hub 24 fastened to stem 13 by a key 25 so that as hub 24 is turned, stem 13 will be rotated thereby and therewith. Hub 24 is provided with a shoulder 26 against which a sprocket wheel 27 seats. Sprocket wheel 27 may be press-fitted on hub 24 or otherwise secured thereto to turn hub 24 when sprocket 27 is moved.

Figure 4:
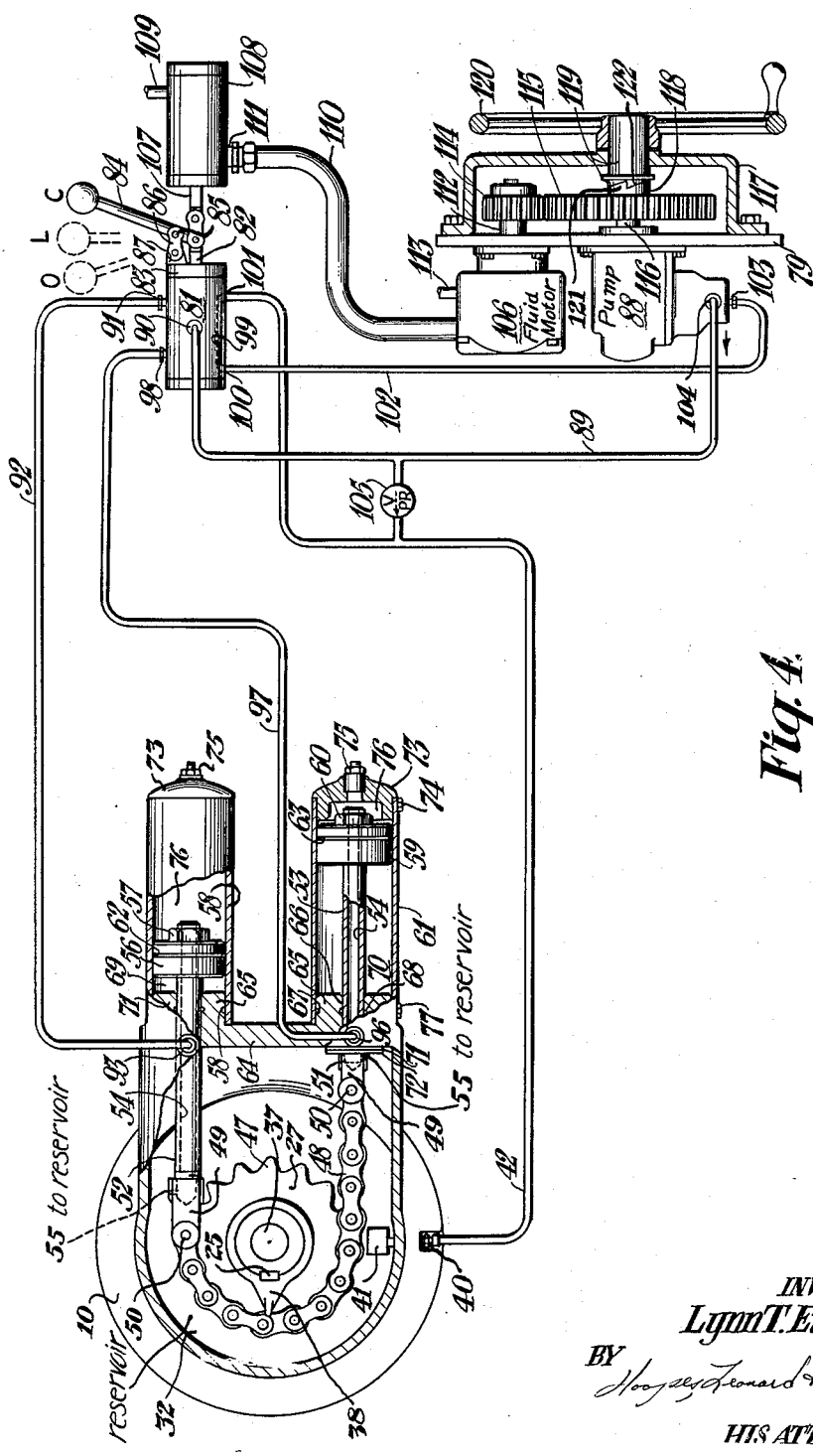
Figure 4 is a view in plan of operating parts of the new operator unit shown in Figure 1 with a schematic representation of one form of circuit and control system suitable for use therewith in a combination under my invention.

Housing 16 may be provided with a central opening 28 at the top thereof through which hub 24 and sprocket 27 may be placed on stem 13 or removed therefrom by relative axial movement. In the assembling step the respective parts of the keyways are brought into registry so that key 25 can be inserted as shown in Figure 4. Opening 28 is also large enough for whatever additional assembly may be made in place as well as for inspection and any adjustment or repair that may be required in the course of the service of an operator unit of my invention.

Opening 28 is covered in the illustrated embodiment by a cap 29. Bolt holes for bolts 30 are also provided to fasten cap 29 to housing 16, a gasket 31 preferably being used between cap 29 and housing 16 to seal the interior space 32 within housing 16. Although unit 10 is shown being used in an upright horizontal position, it will be understood that it may be mounted in other positions as when the valve stem 13 is horizontal or extending downwardly. Such space 32 may be used to contain oil for lubrication of mechanism within that space, or when such a lubricant is utilizable as a hydraulic liquid, as a reservoir 32 for hydraulic liquid, for both such purposes. In the embodiment illustrated, space 32 is additionally used as a hydraulic liquid reservoir although a separate independent tank removed from unit 10 may be used as such a reservoir if desired.

A suitable hydraulic liquid of lubricating oil quality may be used and maintained in space 32 at a level such as that indicated at 39 to cover a passage 40 extending through the side wall, in the illustrated mounting of the embodiment of unit 10, of housing 16. A filter 41 may be fastened to a nipple screwed into one end of opening 40 so that all oil passing through passage 40 will have to pass through filter 41. A reservoir pipe 42 may be connected to the outer end of passage 40. Pipe 42 is a part of the hydraulic circuit system shown through which my operator 10 may be caused to function either locally or at whatever distance from that operator 10 it is desired to place the controls for that system.

Near the bottom edge of housing 16, when the unit is to be mounted horizontally upright as shown, an opening 43 may be provided and normally closed by a plug, to serve as a drain outlet for the contents of reservoir 32 whenever space 32 is to be drained of the liquid therein and fresh oil substituted. A filler opening 44 may be provided in the top of housing 16 and closed by a threaded plug 45 preferably having a small vent 46 extending therethrough so that the space in reservoir 32 or above lever 39 is normally vented to atmosphere. When one of my devices is used in a different position with a self-contained reservoir, the filler opening and vent location will be correspondingly changed to be above the normal liquid level of the unit when in such different position and the connection to pipe 42 will be below that level.

Cap 29 is provided with a journal opening 33 into which the upper part of hub 24 extends, such upper part having an annular groove 34 in which an O-ring 35 is positioned to insure sealing off the interior space 32. The outside of cap 29 may be provided with quadrant markings 36 between extreme open and closed positions shown thereon for valve 11. A pointer cap 37 having a pointer 38 is fastened to the top of hub 24 in such manner that as hub 24 is rotated through the quadrant between open and closed positions, pointer 38 will indicate on dial 36 the extreme positions and all intermediate positions which the valve 12 may be caused to take in the course of and by the functioning of operator 10.

Teeth 47 of sprocket 27 are engaged, in such illustrated embodiment, around 180° thereof by a discontinuous draft or pulling member which, as shown, is a roller chain 48. The end links of roller chain 48 on each side of sprocket 27 are pivotally secured to a clevis 49 by a pivot bolt 50. A threaded recess 51 in each clevis 49 receives and secures the threaded end of the respective piston rods numbered 52 and 53. A pull by rod 52 toward its retracted position serves to close valve 11 and extend rod 53 and a pull by rod 53 toward its retracted position serves to move valve 11 toward open position and extend rod 52. As shown in Figure 1, valve 11 is between the extreme open and closed positions while the valve is shown fully open in Figures 2 and 4.

Each piston rod 52 and 53 is provided with a passage 54 extending therethrough which communicates at the reservoir end with reservoir 32 through an opening 55 in each clevis 49, respectively. The other end of piston rod 52 is affixed to a piston 56 by a nut 57 having suitable lock washer provision thereon to keep the nut from shifting relative to the outer threaded end of piston 52.

The piston 56, if desired since it is single acting in a pulling direction, may be slidable relative to the exterior of piston rod 52 rather than rigidly affixed thereto, in which case an O-ring may be used in an internal annular groove around the bore through piston 56 which fits piston rod 52 to slidably seal the joint between such bore and the exterior of rod 52. Piston 56 is operative in a cylinder 58 which may be termed the closing cylinder.

A like piston 59 engages piston rod 53 to the outer end of which there is a stop nut 60 similar to stop nut 57. Piston 59 is operative in a cylinder 61 which may be termed the opening cylinder. The exterior of pistons 56 and 59 is each circumferentially grooved at 62 and 63 respectively for an O-ring to seal the tolerance between the pistons 56 and 59 and the sides of their respective cylinders 58 and 61. On the side toward cylinders 58 and 61, housing 16 is so fabricated in the illustrated embodiment, as to be provided with a flat wall 64 with projecting cylindrical bosses 65 thereon through which a journaling passage 66 extends for the respective piston rods 52 and 53. Passage 66 may be lined with a suitable bearing sleeve of appropriate bushing material for the respective piston rods. Circumferential outer seals 67 and inner seals 68 inhibit the flow of hydraulic liquid from reservoir 32 into the respective variable rod end spaces 69 and 70 of the cylinders 58 and 61 during the operation of unit 10. The inside of wall 64 where the piston rods extend therethrough may be provided with lands 71 between which lands 71 and the respective opposed faces of clevises 49, spacing washers 72 may be provided as desired or needed to adjust the maximum work stroke of the respective piston rods and pistons on each side of the unit in the course of operation.

Each cylinder is closed at its head end by a dome 73 which is sealed where it is in contact with its respective cylinder and fastened thereto by bolts 74. A plug 75 closes a central opening through each dome 73. The outer end of passage 54 in each piston rod communicates with the respective spaces 76 at the head end of each of the respective pistons 56 and 59 so that the pressure in that head end space 76 is atmospheric when the pressure in reservoir 32 is atmospheric. The other ends of the cylinders 58 and 61 are fastened around the outside of the respective bosses 65 by bolts 77. It will be noted that the components utilized in the making up of an embodiment of my invention like unit 10 are standard articles of commerce for the most part which can readily be obtained and/or fabricated. In like manner, the assembly of new units of my invention is relatively simple and considerable sub-assembling can be done beforehand.

In the case of the embodiment illustrated in Figures 1 to 4 and 8, the hydraulic circuit system and the controls therefore are mounted locally relative to unit 10. However, such controls either for selective manual or selective motor operation, or both, of operator 10 may be positioned at any desired distance from operator 10, the remote controls in that case being connected to operator 10 by pipes in the hydraulic liquid circuit. As shown, the front of housing 16 is provided with brackets 78 suitably secured thereto for controls in proximate relation to valve 11. The controls themselves may be mounted, if desired, on a panel 79 which is rigidly fastened to the brackets 78. Where panel 79 is used on a relatively large valve, legs 80 may be attached to the bottom edge of panel 79 and extend to the ground or to a platform for connection to insure the rigidity of the mounting of the controls on panel 79. While various modifications in my control setup may also be made, as will be understood by those having skill in the art to whom this invention is disclosed, the illustrated control and circuit arrangement is suitable, for example, for an operator 10 connected to a valve in a gas pipeline through which gas, usually at somewhat high pressure, is transmitted over desired distances.

As shown, a hydraulic control valve 81 may be provided with a slidable valve spool therein having a spindle 82 projecting through the valve head 83 for pivotal connection to the lower end of a control lever 84. Control lever 84 may be pivotally fulcrumed at 85 by a link 86 in turn pivotally connected to a bracket 87 integral with head 83. The recessing of the valve spool and the porting of the valve 81 is such in the illustrated embodiment that when handle 84 is moved to the position C shown in Figure 4 with the spool to its extreme left in valve 81, the unit 10 will close valve 12 assuming it is fully or partly open. Operator 10 and lever 84 may be left in position C until valve 12 is fully closed or partly closed to some intermediate position such as 36, as desired.

A flow of hydraulic liquid occurs when control handle 84 is moved to position C in that hydraulic liquid is discharged under pressure by a pump 88 actuated when handle 84 is so moved out of position L. That hydraulic liquid flows through delivery pipe 89 and enters port 90 in valve 81 whence it is conducted to port 91 and from thence through pipe 92 to a port 93 in wall 64. Port 93 is in communication through passages 94 with the interior space 69 at the rod end of cylinder 58. Thereby, piston 56 is pushed to the right, as viewed in Figure 4, pulling rod 52 and moving valve 11 to a more closed position by the clockwise rotation, as viewed in Figure 4, of sprocket 27 through the medium of roller chain 48.

In addition, such movement of piston 56 returns piston 59 toward its base 65 causing hydraulic liquid in the interior space 70 of cylinder 61 to flow out through passages 95 which are identical to the passages 94. From passages 95, the hydraulic liquid being exhausted flows out through port 96 and thence through pipe 97 into port 98 in valve 81 wherein it enters a common internal passage 99 which at all times connects port 100 and port 101 of valve 81. Reservoir pipe 42 is connected to and in communication with port 101 while pump suction pipe 102 is connected to and in communication with port 100. Hence, suction pipe 102 will always have adequate hydraulic liquid for pump 88 through port 103 to be discharged under pressure through port 104 and pipe 89 whenever pump 88 is actuated, such hydraulic liquid being available as exhaust from the rod end of a cylinder such as cylinder 61 in a closing operation, or from pipe 42 through port 101, or both.

The cylinders are normally full of hydraulic liquid on the pressure or rod side of the respective pistons corresponding to the side having the interior volumes 69 and 70 respectively. The head ends of the respective pistons between the nuts 57 and 60 and the respective domes 73 may or may not be full of hydraulic liquid depending upon the level of hydraulic liquid in reservoir 32 or in an outside reservoir if such an exterior reservoir is used. The various pipes between parts of unit 10 mounted on the valve and control parts thereof mounted on panel 79 are normally also always full of hydraulic liquid. In such a closing movement wherein piston 56 moves to the right and sprocket 27 moves clockwise, as viewed in Figure 4, the hydraulic liquid in the head end 76 of cylinder 58 exhausts through passage 54 and piston rod 52 directly into reservoir 32. In such movement, moreover, as piston 59 moves to the left, as viewed in Figure 4, additional hydraulic liquid will enter the space 76 at the head end of piston 59 through the passage 55 and the passage 54 in piston rod 53.

On the other hand, when control handle 84 is put in position O, the spool in control valve 81 is moved to the extreme right and unless stopped at an intermediate position by moving handle 84 to position L, piston 59 will pull rod 53 and turn valve 12 toward open or more open position, such turning being shown on the indicator by the pointer 38. Valve 12 may be stopped in any extreme or intermediate position and hydraulically locked through my new system by shifting control handle 84 to its central position L. Piston 59, shown in dotted outline in Figure 1, in turn will move to the right as viewed in that figure. Thereby, piston rod 53 will pull chain 48 rotating sprocket 27 in a counterclockwise direction as viewed in Figure 4. If control handle 84 is left in such position O, the parts will reach the relative position shown in Figure 4 with the valve 11 and its plug 12 in fully open position unless such opening movement is halted at some intermediate position.

While operator 10 is moving valve 11 in the course of such an opening operation, hydraulic liquid under pressure due to the actuation of pump 88, will enter port 90 from pipe 89 and this time flow out of port 98 through pipe 97 into port 96, through the passages 95 and into the rod end volume 70 thereby pushing piston 59 to the right and pulling piston 53, the chain 48, the sprocket 27, the piston rod 52 and the piston 56 toward position of the respective parts representing an opening of the valve 11.

During such opening operation, further, exhausting hydraulic liquid from decreasing volume 69 in cylinder 58 will flow out through pipe 92 and enter port 91 to pass to common passage 99 because of the setting of the spool in valve 81. Hydraulic liquid in the head end volume 76 of cylinder 61 will exhaust to the extent required through passage 54 in piston rod 53 directly into reservoir 32. And, hydraulic liquid in reservoir 32 will flow through passage 54 in piston rod 52 into the head end volume between nut 57 and dome 73 in cylinder 58 as such head end volume increases due to the return movement of piston 56 to the left, as viewed in Figure 4, while piston 59 continues to pull to the right in the course of such an opening operation.

A normally closed pressure relief valve 105 is interconnected between pressure pipe 89 and reservoir pipe 42, or such pressure relief valve may be incorporated within control valve 81. During normal functioning of unit 10, valve 105 is closed and remains closed. However, if handle 84 is not returned to position L after either piston 56 or piston 59 has pulled as far to the right in their respective cylinders, as viewed in Figure 4, as the structure permits, any increase in pressure due to the continuing turning of pump 88 will thereafter open valve 105 and discharge the hydraulic liquid under pressure from pipe 89 into reservoir 32 in the direction of the dotted arrow in valve 105 in Figure 4. If desired, means may be incorporated with a pressure responsive device to either shut off motor 106 and thereby stop pump 88 when either spacer 72 abuts its respective land 71, or to return control handle 84 from its O or C position, as the case may be, to its neutral position L thereby closing a valve 108 and shutting off motor 106 and stopping pump 88.

In the illustrated embodiment, the lower end of control handle 84 may also be pivotally linked to a spindle 107 of fluid admission valve 108. Spindle 107 may be connected to a spool inside valve 108, the porting of which spool and valve are so constructed and arranged that when handle 84 is in any position other than its neutral position L, fluid like gas under pressure will flow from a tap in pipeline 14 into a port 109 and from thence be discharged into pipe 110 through port 111. The other end of pipe 110 is connected to and communicates with fluid motor 106, which may be of a conventional make. Thus, motor 106 may have a rotating vane member therein which converts the pressure energy in the gas admitted to the motor into a turning moment to turn motor shaft 112, the gas leaving motor 106 being discharged through an exhaust port 113.

A drive pinion 114 is keyed to shaft 112. Pinion 114 meshes with a driven gear 115 keyed to a drive shaft 116 of rotary pump 88. Such gears may be enclosed in a suitable gear case cover 117 removably fastened to panel 79. A further valve (not illustrated) is preferably incorporated in the gas supply pipe connected to port 109 to enable such gas supply to be shut off whenever unit 10 is to be operated by hand. Normally, unit 10 is operated by power, in the case of the illustrated embodiment, by the supplying of gas under pressure to motor 106 to turn it and thereby operate pump 88 to deliver hydraulic liquid under such pressure as may be desired within the capacities of pump 88 through the pressure pipe 89 to whichever side of unit 10 is open through valve 81. During such a power operation, a hub 118 on shaft 116 is normally out of engagement, as shown in Figure 8, with the shaft 119 of a handwheel or handcrank 120 which may be used to turn pump 88 manually whenever such a hand operation is desired as an auxiliary or emergency matter.

Hub 118 is provided with crown teeth 121 which are so formed as to cooperate with and engage crown teeth 122 on the inner end of a handwheel shaft 119 when handwheel 120 is pushed in and turned in a clockwise direction as viewed from the right of Figure 4. Shaft 119 is hollow and cup shaped to accommodate a spring 123 which extends across the gap 124, when the respective teeth 121 and 122 are disengaged, into a recess 125 in hub 118 to urge the shaft 119 outwardly and away from hub 118. Shaft 119 is suitably slidably mounted in a collar 126 which may be an indirect part of a cover 117 fixed to panel 79 and its outward movement is limited by a flange 127. Handwheel 120 is suitably affixed to shaft 119 as by a set screw 128. Should handwheel operation be desired, handwheel 120 is pushed inwardly from the normal position shown in Figure 8 against the pressure of spring 123 until the teeth 121 and 122 engage, the turning of handwheel 120 in the appropriate direction being sufficient to hold such teeth in such engagement so long as such turning continues to cause the desired movement of unit 10 and valve 11. When handwheel 120 is released, spring 123 takes over and pushes it outwardly and the respective teeth 121 and 122 apart and out of engagement. The direction of an operative turning of handwheel 120 is the same whether the unit 10 is being used to open or to close a valve connected thereto, the direction of application of the hydraulic liquid force due to the handwheel movement being under the directional control of control handle 84 through being in its opening O or closing C position, as the case may be.

Inasmuch as both handwheel 120 and the power control elements of unit 10 are connected to the remaining parts of operator 10 by hydraulic liquid pipes, it will be clear that the control elements, whether for power operation or for hand operation, may be mounted at whatever distance is desired from a valve which is to be operated by a device made in accordance with my invention. Moreover, the parts on the control means, shown mounted on panel 79 in the illustrated embodiment, may be variously arranged without departing from the instant invention. Thus, a separate control handle may be utilized for the fluid admission valve 108 rather than utilizing control handle 84. Further, other suitable emergency sources such as oil under pressure or liquid under pressure may be utilized to run a motor like motor 106 which is obtainable as an article of conventional manufacture and such motor may be of a gear or other type if desired. In lieu of such a fluid operated motor, an electric motor may be used. Similarly, although the pump 88 shown is one of a conventional make, it is possible to use other kinds of pumps including reversible pumps if the motor and valving are made to correspond. In the illustrated embodiment, a selection in the direction of the force supplied is obtained through control valve 81, a reversible motor-pump may also be used for such selection with direct piping to the respective cylinders in a new unit of this invention. Other arrangements and assemblies of control valve, motor and pump elements within the scope of this invention will occur to those skilled in the art to whom this invention is disclosed.

In any such operation, whether by power or hand, the positive pull effected by a device of this invention produces a positive and precise opening or closing, as the case may be, of the rotation member being acted upon by one of my new operators. Moreover, when my new device is hydraulically locked so that hydraulic liquid can neither enter nor exit from the rod end volume of the respective cylinders, as when control handle 84 is in its L position, the rotatable member so positioned by my new device will remain there without creeping or changing its position until a further operative action is initiated through such device.

Another embodiment of my invention is schematically illustrated in Figures 5 to 7, inclusive, and parts corresponding generally in structure and functioning are provided with the same reference numerals with the addition of a prime factor thereto. In such further embodiment, the two cylinders in the upper tier are closing cylinders and are also shown in Figure 6, while the two cylinders in the lower tier are opening cylinders which are also shown in Figure 7. Thereby, smaller cylinders may be utilized and nested as shown in Figure 5, that is, they are offset and staggered relative to a plane through the axis of stem 13' and parallel to the respective axes to the piston rods 52' and 53'. Thus, in elevation, as shown in Figure 5 the upper part of the right-hand cylinder 61' hides the lower portion of right-hand cylinder 58' while on the left-hand cylinder 58' hides the upper portion of the left-hand cylinder 61'. In the further embodiment, the cylinders 58' constitute a pair in tangential additive relation in the upper tier and are closing cylinders for valve 11'. Each cylinder 58' has its piston rod connected to a respective cable length 48'c to which its respective piston rod 52' is joined by a cable socket 49'. The other end of the cable length 48'c is connected by an anchor 47'c to member 27' at the bottom of the closed cable groove 27'c extending circumferentially around the exterior member 27' in the plane of the respective cable lengths 48'c which are in tangential relation to each other on opposite sides of the device. Likewise, opening cylinders 61' are in tangential additive relation and each is provided respectively with a piston 59' and piston rod 53' connected to a cable length 48'a by a socket 49'. The other ends of the cable lengths 48'a are connected by anchors 47'a to member 27' at the bottom of the lower cable groove 27'a extending circumferentially around the outside of member 27'. The additive pair of cylinders in the respective opening and closing tiers of the further embodiment act to counterbalance any pull at an angle to a plane through the axis of stem 13' and perpendicular to the axes of the respective cylinders.

In operation, as valve 11' is opened from the closed position shown, the cable lengths 48'a begin to unwrap as the piston rods 53' are retracted into the cylinders 61' by the pull of pistons 59'; at the same time, the cable lengths 48'c begin to wrap themselves into groove 27'c as the rods 52' are pulled out of the respective inactive cylinders 58'. In opening valve 11', pistons 56' pull together and the parts move the other way. The same control system may be used as that shown in the previously described embodiment except that the lines corresponding to pipes 92 and 97 would lead to the pairs of cylinders 58' and 61' respectively.

Thus, various modifications may be made in particular aspects of my new device and different uses and changes in the illustrative examples may be made without departure from the spirit of my invention or the scope of the appended claims.

I claim:

1. In an operator for a valve with a rotatable stem, apparatus comprising, in combination, a sprocket, a length of chain engaging said sprocket, a pair of spaced parallel cylinders having closed rod ends and piston rods respectively and adjustably connected to the ends of said chain to drive said sprocket by oscillating it, said ends of said chain being tangential to said sprocket and in alignment with said piston rods respectively, a housing enclosing said sprocket and chain, said cylinders being mounted on the same side of said housing and having their piston rods extending into said housing, a piston in each cylinder respectively connected to said piston rods, a control valve to selectively communicate with the rod end of the selected one of said cylinders to supply hydraulic liquid thereto and return liquid therefrom, a reservoir for hydraulic liquid in said housing, said piston rods having a passage therethrough communicating with the head ends of said respective cylinders and said reservoir, a selectively alternate power and manually operable pump to supply said hydraulic liquid under pressure to the rod end of any cylinder selected at the time being by said control valve, and a communicating passage between said reservoir and the inlet of said pump.

2. An operator as set forth in claim 1, in which said chain is in the form of cable lengths and said sprocket is in the form of a drum to be turned in one direction or the other by said cable lengths.

References Cited in the file of this patent

UNITED STATES PATENTS

| | | |
|---|---|---|
| 616,211 | Taylor | Dec. 20, 1898 |
| 999,371 | Keller | Aug. 1, 1911 |
| 1,182,967 | Bowser | May 16, 1916 |
| 1,329,137 | Oldham | Jan. 27, 1920 |
| 1,454,396 | MacDonald | May 8, 1923 |
| 1,616,841 | Beebe | Feb. 8, 1927 |
| 2,278,557 | Overbeke | Apr. 7, 1942 |
| 2,595,131 | Ehmann | Apr. 29, 1952 |
| 2,643,677 | MacLean | June 30, 1953 |
| 2,722,102 | Pilch | Nov. 1, 1955 |

FOREIGN PATENTS

| | | |
|---|---|---|
| 473,532 | Canada | May 15, 1951 |
| 2,424 | Great Britain | July 10, 1874 |